J. A. LARSEN.
PUMP.
APPLICATION FILED MAR. 16, 1916.

1,437,664.

Patented Dec. 5, 1922.

Witnesses
A. Schreibersdorf
A. C. Abbott

Inventor
Jens Andreas Larsen
By
Attorney

Patented Dec. 5, 1922.

1,437,664

UNITED STATES PATENT OFFICE.

JENS ANDREAS LARSEN, OF COPENHAGEN, DENMARK.

PUMP.

Application filed March 16, 1916. Serial No. 84,557.

*To all whom it may concern:*

Be it known that I, JENS ANDREAS LARSEN, a subject of the King of Denmark, residing at Copenhagen, Denmark, have invented certain Improvements in Pumps, of which the following is a specification.

This invention relates to certain improvements in pumps, and more particularly in pumps of that class or type which are especially designed and adapted for use under certain special conditions as, for example in dairies and the like, where it is desirable so to regulate or control the operation of the pump as to vary its capacity in order to conform with and accommodate variations occurring from time to time in the fluid supply, and the object of the invention is, in part, to provide a pump of this general character having novel and improved controlling or regulating means, whereby such variation in capacity may be effected in a simple and convenient manner, and in part to provide for use in such pumps controlling or regulating means of the character described, rendering the same capable of operation in a substantially automatic manner, in order to dispense with such intimate care or supervision as might otherwise be requisite for avoiding the liability of derangement or breakdown of the pump itself, or of the apparatus in connection with which the same is used.

The invention consists in certain novel features of the construction, and combinations and arrangements of the several parts of the improved pump, whereby the same is rendered simpler, less expensive, and otherwise better adapted and more convenient and effective for use, all as will be hereinafter fully set forth.

The novel features of the invention will be carefully defined in the claims.

In order that my improvements may be the better understood, I will now proceed to describe the invention with reference to the accompanying drawings, wherein—

Figure 1:
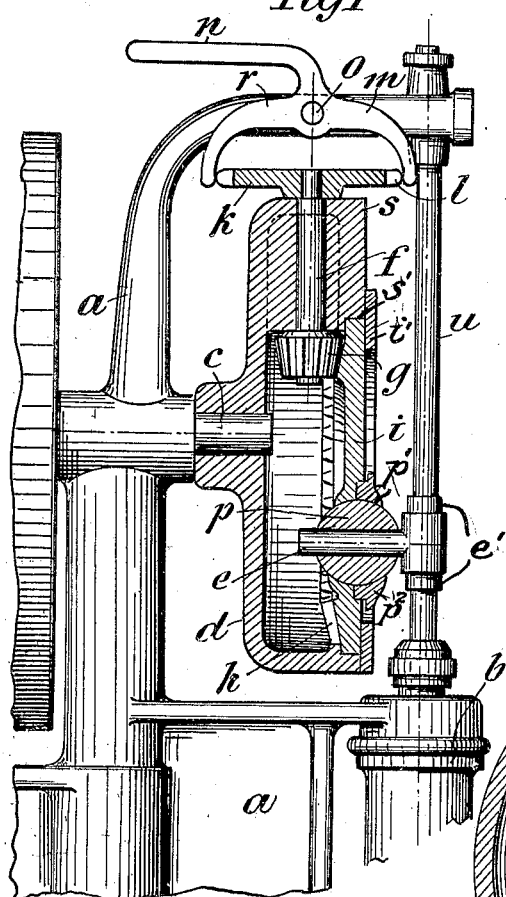
Figure 2:
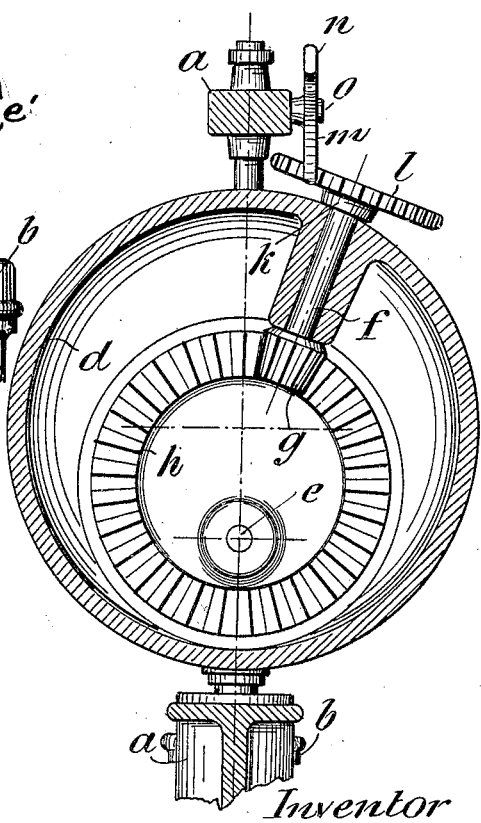

Figure 1 is a fragmentary sectional elevation showing the driving devices of a pump embodying my invention, and Figure 2 is a sectional detail view taken in a plane at right angles to the plane of the section in Figure 1, showing features of construction to be hereinafter referred to.

As shown in these views, my improvements are embodied in a reciprocatory pump having a vertically arranged cylinder or barrel $b$ supported upon a frame or standard $a$, the upper part of which is extended upwardly above said barrel, so as to afford a bearing for a horizontally directed driving shaft $c$ actuated from any suitable source of power and provided with a crank member $d$ herein shown as made in the form of a flattened chambered disk, the front wall or side $s$ of which is provided with an eccentrically positioned annular bearing $s^1$ wherein is mounted to turn an eccentric disk or member $i$ held in place in said bearing by means of an annular bearing member $i^1$ applied to the outer surface of said wall $s$ and engaging the outer surface of said eccentric disk or member $i$ as clearly shown in Figure 1.

The eccentric disk or member $i$ is provided with a bearing $p^1$ positioned eccentrically with relation to the axis of rotation of said member in its bearings $s'$, and adapted to receive a spherical bearing member $p$ held in place in said bearing by means of an outer bearing ring or member $p^2$ applied upon the outer surface of the ring or member $i$ and provided with an axial bore or passage in which is mounted for endwise sliding movement a crank pin $e$ carried by and projecting from the piston rod $u$ of the pump, which latter projects upwardly from the pump cylinder or barrel $b$ and is guided at its upper end for rectilinear reciprocatory movement in a slide bearing at the upper overhanging portion of the frame or standard $a$.

The crank pin $e$ is mounted upon the piston rod $u$ between collars $e'$ as clearly shown in Figure 1, so as to be adapted for a certain extent of turning or pivotal movement thereon in a plane at right angles to the direction of movement of the piston rod when reciprocated, and in the structure shown, this lateral pivotal or adjusting movement of the crank pin, in conjunction with its sliding movement in the axial bore of the spherical bearing member $p$, and the substantially universal movement of the latter in its bearing in the eccentric disk or member $i$ serves to accommodate the rotary movement of the crank disk or member $d$ carrying said eccentric disk or member $i$ to the rectilinear reciprocatory movement of the piston rod $u$ so that the latter is driven from the shaft $c$ without recourse to the employment of a pitman or connecting rod.

In the embodiment of the invention herein shown, it will be evident that upon rotation of the eccentric disk or member $i$ in its bearing $s'$ in the crank disk or member $d$, a certain variation in the stroke imparted by the crank pin $e$ to the piston rod $u$ is attained by reason of the eccentricity of said bearing $s'$ with regard to the axis of rotation of the crank disk or member $d$ on which the bearing member $p$ for said crank pin is eccentrically positioned, whereby it will be seen that whenever desired, by simple turning movement of the eccentric disk or member $i$ relatively to said crank disk or member $d$, a rapid and effective variation of the stroke of the pump piston may be effected to control and regulate the action of the pump in conformity with variations in the volume of fluid supplied thereto as the same may occur from time to time.

According to my invention means is provided whereby such control or regulation of the piston stroke may be effected mechanically and in the embodiment of the invention herein shown, such means includes devices for turning the disk or member $i$ in its bearing in the crank disk or member $d$ for which purpose said eccentric disk or member is provided with a peripheral toothed gear surface $h$ meshing with the teeth of a miter pinion $g$ carried upon a stud or shaft $f$ journaled in the perimeter of the crank disk or member $d$, the pinion $g$ being within the chamber of the crank disk upon the inner end of said shaft or stud $f$, the outer end of which carries a toothed gear wheel $k$, whose teeth are adapted, upon successive rotations of the crank disk or member $d$, for successive engagement with one or the other of the forks or bifurcations $m$ of a pallet lever $r$ fulcrumed at $o$ upon the upper overhanging part of the frame or standard and provided with a handle $n$ by means of which it may be manipulated to cause one or the other of its arms or pallets $m$, which are at opposite sides of the gear wheel $k$, to engage the teeth of the latter.

By this means it will be apparent that when said lever $r$ is rocked in one direction, the corresponding arm or pallet $m$ thereof will engage the teeth at one side of the wheel $k$ at each successive rotation of the crank disk or member $d$, so as to give rise to a gradual or intermittent rotatory movement of the eccentric disk or member $i$ in one direction in its bearing $s'$, so as to reduce the stroke of the pump piston gradually in conformity with a reduction in the supply of fluid to the pump, or in case the supply be increased, a reverse movement of the lever $r$ will cause its oppositely arranged arm or pallet $m$ to engage the teeth at the opposite side of the gear wheel $k$, so that the direction of rotation of the eccentric disk or member $i$ in its bearing $s'$ is reversed, and a gradual increase in the stroke of the pump piston is effected.

The arms or pallets $m$ of the lever $r$ are so arranged also that the lever may be adjusted to a central or intermediate position, as illustrated in Figure 1, in which adjustment of the parts it will be apparent that said oppositely arranged arms or pallets $m$ are both maintained out of engagement with the teeth of the gear wheel $k$ in order that constant operation of the pump may be maintained indefinitely when desired. By adjustment of said lever $r$ so that one or the other of its arms or pallets shall engage the teeth of the gear wheel, the capacity of the pump may be increased or diminished to the point desired, and when the desired capacity is attained, the adjustment of said lever to its central or inactive position will enable the pump to be operated at constant capacity until such time as further regulation may be necessary.

It will be apparent that the structure and arrangement of the controlling means as herein set forth is such as will assure a substantially automatic operation thereof in effecting desired regulation or variation in the operation of the pump, since the eccentric disk or member $i$ being adapted for complete rotation in its bearing, is adapted for recurrent operation under the influence of the lever $r$, wheel $k$, and related gearing, so that in case the pallets or arms of said lever $r$, through oversight of the attendant, be left remaining in position for engagement with the teeth of wheel $k$, no damage or derangement of the parts will result, the only effect being alternating gradual increases and diminutions in the capacity of the pump from its maximum capacity to its minimum, and vice versa, or in other words, operation of the pump at half capacity.

Having thus described my invention, what I claim and desire to secure by Letters Patent is—

1. A device of the character described having a rotatable supporting member, an eccentric member adjustably supported thereon, a crank pin having eccentric relation to said eccentric member and adapted, during adjustment of the same, to be moved nearer to or farther from the rotative axis of said supporting member, and means actuated from rotation of the supporting member, for rotating said eccentric member to vary the adjustment of the crank pin.

2. A device of the character described having a rotatable supporting member, an eccentric member rotatably adjustable upon the supporting member, a crank pin having eccentric relation to the eccentric member and adapted, during rotative adjustment thereof, to be moved recurrently nearer to and farther from the rotative axis of said supporting member, and means including toothed gearing actuated from rotation of the supporting member, for rotating said eccentric member to vary the adjustment of the crank pin.

3. A device of the character described having a rotatable supporting member, an eccentric member rotatively mounted upon the supporting member, a crank pin having eccentric relation to the eccentric member, and means intermittently actuated from rotation of the supporting member for rotating said eccentric member relatively to the supporting member, operable to move the crank pin recurrently nearer to and farther from the rotative axis of said supporting member.

4. A device of the character described having a rotatable supporting member, an eccentric member rotatably supported thereon, a crank pin having eccentric relation to said eccentric member, and means actuated from rotation of the supporting member, to communicate rotative movement to said eccentric member and operable automatically to move said crank pin first farther from and afterwards nearer to the rotative axis of said supporting member.

5. A device of the character described having a rotatable supporting member, an eccentric member rotatably supported thereon, a crank pin having eccentric relation to said eccentric member, and reversible means operable, from rotation of the supporting member, to communicate reverse rotative movements to said eccentric member to move said crank pin nearer to or farther from the rotative axis of the supporting member.

6. A device of the character described having a rotatable supporting member, an eccentric member rotatably supported thereon, a crank pin having eccentric relation to said eccentric member adapted, during rotation of the same to be moved nearer to or farther from the rotative axis of the supporting member, and capable of pivotal movement relatively to said eccentric member to compensate for rectilinear movement of a member wherewith said crank pin is connected, and means for rotating said eccentric member operable to move the crank pin first to the rotative axis of the supporting member and afterwards away from said rotative axis.

7. A device of the character described having a rotatable member, a reciprocatory member, means for driving one of said members from the other including a wrist pin, and means intermittently actuated from the movement of one of said members for imparting progressive eccentric adjustment to the wrist pin with respect to the rotative axis of the rotatable member.

8. A device of the character described having a rotatable member, a reciprocatory member, means for driving one of said members from the other including a wrist pin, and means for adjusting the wrist pin eccentrically with respect to the rotative axis of the rotatable member including a part mounted to turn upon the rotatable member, and gearing for driving said part intermittently.

9. A device of the character described having a rotatable member, a reciprocatory member, means for driving one of said members from the other including a wrist pin, and means for adjusting the wrist pin eccentrically with respect to the rotative axis of the rotatable member, including gearing carried by the rotatable member, and a member intermittently engageable with said gearing during movement of the rotatable member.

10. A device of the character described having a rotatable member, a reciprocatory member, means for driving one of said members from the other including a wrist pin, and means for adjusting the wrist pin eccentrically with respect to the rotative axis of the rotatable member, including a gear carried upon the rotatable member, and a member adapted for interchangeable engagement at opposite sides of the gear to turn the same in opposite direction.

11. A device of the character described having a rotatable member, a reciprocatory member, means for driving one of said members from the other including a wrist pin, and means for adjusting the wrist pin with respect to the rotative axis of said rotatable member including a gear wheel carried upon one of the members, and a member adapted for interchangeable engagement at opposite sides of said gear wheel to turn the same in the same in opposite directions.

Signed by me at Copenhagen, Denmark, this fourteenth day of February, 1916.

JENS ANDREAS LARSEN.

Witnesses:
CHARLES HUDE,
I. KNUDSEN.